Figure 1:
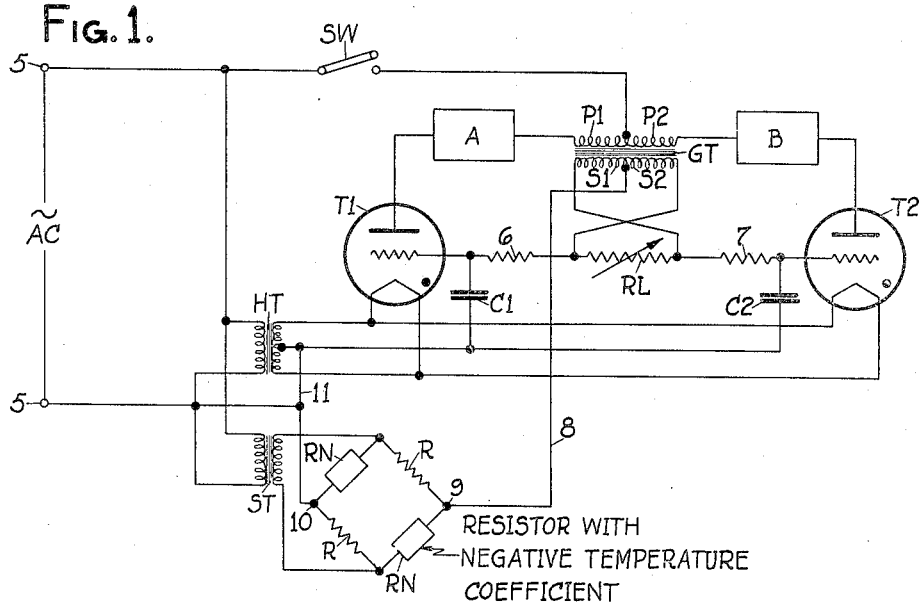

Jan. 3, 1950     D. V. EDWARDS     2,493,575

CONTROL APPARATUS FOR GAS TUBES

Filed Oct. 23, 1947     2 Sheets-Sheet 1

INVENTOR.
D. V. Edwards,
BY Neil D. Preston,
his ATTORNEY

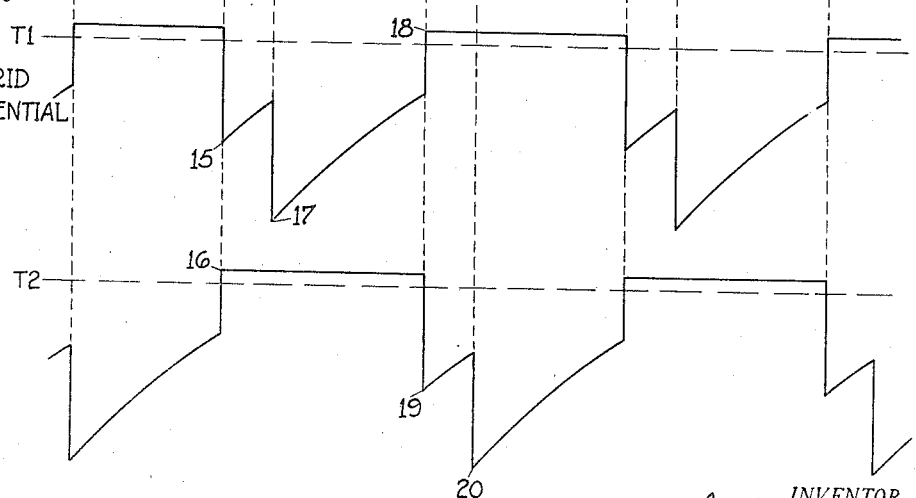

Patented Jan. 3, 1950

2,493,575

UNITED STATES PATENT OFFICE 2,493,575

CONTROL APPARATUS FOR GAS TUBES

Donald V. Edwards, Montclair, N. J., assignor to Electrons, Incorporated, Newark, N. J., a corporation of Delaware Application October 23, 1947, Serial No. 781,565

10 Claims. (Cl. 315—252)

This invention relates to circuit organizations for governing the operation of electron discharge tubes, and more particularly to grid control circuits for rendering a plurality of gas tubes alternately conductive at intervals separated by one intervening cycle of the alternating voltage applied to the anodes of the tubes.

In certain applications and uses of grid control gas discharge tubes for supplying uni-directional or rectified current from an alternating current supply voltage to different types of load, it is desirable to render two tubes alternately conductive at periods less than the frequency of the supply voltage. For example, when a load current exceeding the continuous current rating of a single gas tube is involved, it is expedient to employ two tubes and govern their grids so that these tubes conduct for alternate cycles of the supply voltage. Also, in connection with the use of gas tubes for the intermittent actuation of various types of electro-magnetically operated devices, such as vibratory equipment or the like, it is sometimes desirable to obtain operation of the equipment at half the rate or periodicity of the frequency of the regular alternating supply voltage.

With these and other considerations in mind, the primary object of this invention is to provide a simple and efficient circuit organization for governing the grids of a pair of gas tubes in such a way that each of these tubes is conductive at intervals separated by an intervening positive half cycle of its anode voltage.

Other objects, characteristic features and attributes of the invention will be in part apparent, and in part pointed out as the description progresses.

Generally speaking, and without attempting to define the nature and scope of the invention, it is proposed to employ an impulse transformer or equivalent element associated with the anode and grid circuits of a plurality of tubes, which is responsive to changes in anode current through the tubes, and which acts to provide impulse voltages in the grid circuits of the tubes such that the grid of each tube when it stops conducting is made sufficiently negative to prevent conduction again occurring through that tube until after an intervening positive half cycle of anode voltage, so that the tubes are fired alternately on alternate cycles of the supply voltage.

It should be understood that this is merely a general introductory statement, and that various other aspects and characteristic features of the invention will become apparent as the nature of the invention is further developed by explaining the structure and mode of operation of certain specific embodiments of the invention.

Although the invention may take a wide variety of forms, its fundamental functions and mode of operation are exemplified in the specific embodiments illustrated in the accompanying drawings, in which the parts and circuits have been shown in a simplified and conventional manner, more for the purpose of facilitating an explanation and understanding of the invention, than for the purpose of showing in detail a particular construction and arrangement of parts preferably employed in practice.

Figure 2:
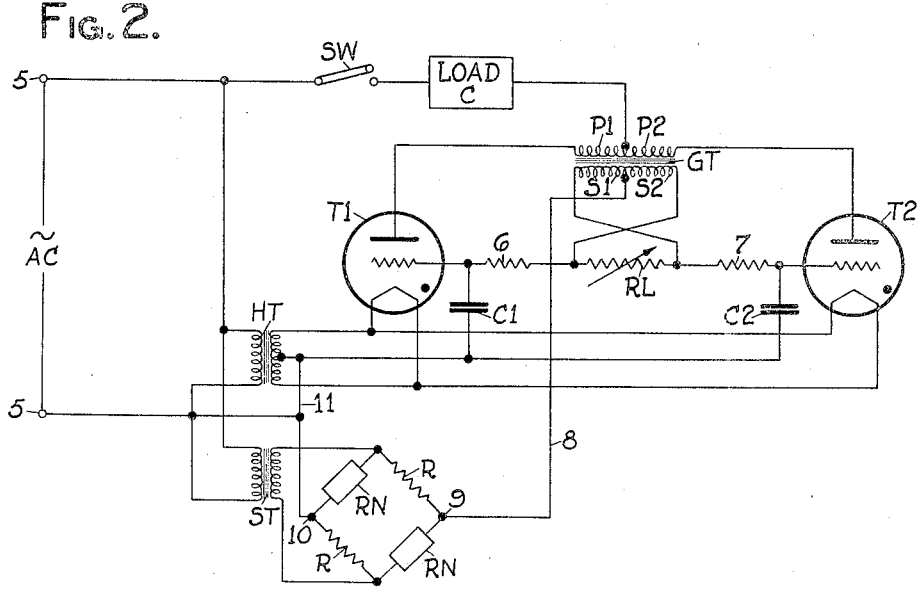

In the accompanying drawings, Fig. 1 illustrates diagrammatically one circuit organization embodying the invention; Fig. 2 illustrates a modified arrangement; and Figs. 3A to 3D show for explanatory purposes certain voltage and current graphs or curves for typical operating conditions.

This invention contemplates the use of a pair of electron discharge tubes of the gaseous discharge type, conveniently termed gas tubes, which are assumed to be of the usual grid control hot cathode type, with a suitable filling of mercury vapor, or a rare gas, such as xenon or the like.

The particular structure of such a gas tube is not material to this invention; and the usual cathodes, grids or anodes for such tubes are shown conventionally in the drawings.

In the simplified embodiments of the invention illustrated, it is assumed that a pair of grid control gas tubes T1 and T2, associated with a suitable source of alternating current connected to terminals 5, are to be controlled in accordance with this invention to act alternately to supply current to suitable electrically operable devices or loads at regular recurrent intervals at half the frequency of the supply voltage. In Fig. 1, these devices or loads A and B, illustrated conventionally in block form, may be of any suitable type which are to be energized or actuated intermittently and alternately. For example, the devices A and B indicated in Fig. 1 may be the operating coils or magnets of some type of vibratory equipment, or these devices A and B may be different parts of some other electrically operated equipment, or parts or different portions of a load of the same character.

In the arrangement shown, it is assumed that the cathodes of the tubes T1 and T2 will be heated by alternating current from a heater transformer HT in the usual manner. This heater transformer HT has its primary connected to the supply source, and is provided with a center tap on its secondary for connection of the external load circuit to the cathodes of the tubes, as to be readily understood without detail explanation of the circuit connections.

The anode circuits of the tubes T1 and T2 include, in addition to the devices A and B, together with a suitable control switch SW if desired, the respective opposing primary windings P1 and P2 of a grid transformer GT. A resistor RL or other load is connected across the opposing secondary windings S1 and S2 of this grid transformer GT, and the common or center tap of these secondaries is used in Fig. 1 for a cathode connection of the grid circuits for these tubes, as later explained. The grids of the tubes T1 and T2 are connected in series with suitable grid resistors 6, 7 to the terminals of the secondary windings S1 and S2 of the grid transformer GT. In the particular arrangement shown, small capacitors C1 and C2 are connected between the grids and cathodes of the tubes T1 and T2 for the purpose of minimizing the effect upon the potential grid causes by momentary voltage surges or "hash" in the anode circuits acting through the electrode capacity between the grids and anodes. These capacitors C1 and C2 are preferably used to obtain more stable operation under certain adverse operating conditions, but are optional and have nothing to do with the grid control features of this invention.

In the typical hot cathode type of tube contemplated in connection with this invention, for reasons commonly understood it is important that the cathode should be fully heated to its proper emission temperature before the tube is used to conduct load current; and where these tubes are used in equipment such as contemplated, it is expedient to provide some automatic device to prevent conduction through the tubes until the cathode has been properly heated. In the arrangement shown for this purpose, current from a starting transformer ST in multiple with the heater transformer HT is supplied to a resistance bridge including resistor elements RN having a negative temperature coefficient, and the voltage across this bridge is included in the grid circuits for the tubes T1 and T2. Each of the resistors RN with a negative temperature coefficient may be any one of the various well known types for this purpose, which comprise some special composition including carbon or the like, so that its resistance becomes lower as its temperature increases. This resistance bridge also includes resistors R of the usual type with positive temperature coefficients, which increase their resistance with temperature.

Considering the operation of this automatic device for assuring heating of the cathodes of the tubes T1 and T2 when first put into use, when the supply voltage is first connected to the terminals 5 by any suitable switching equipment (not shown), and current is supplied to the heating transformer HT, the starting transformer ST is energized at the same time, and acts through the bridge arrangement of resistors to maintain the grids of the tubes T1 and T2 sufficiently negative to prevent firing of either tube for a time, until the resistors RN with the negative coefficient of resistance are fully heated. This assures that when power is first applied to put the tubes into use, anode current will not be conducted until after a lapse of time sufficient to bring the cathodes of the tubes up to their normal operating temperature. Considering this operation more in detail, the grid circuit for the tube T2, for example, may be traced through its grid resistor 7, to the terminal of the left-hand secondary winding S1 of the grid transformer GT, wire 8, to the right-hand terminal 9 of the resistance bridge, through the resistors R and RN of this bridge to its left-hand terminal 10, and wire 11 to the center tap of the heater transformer HT, and to the cathodes of the tubes. The other tube T1 has a similar grid circuit through the other secondary winding S2 of the grid transformer GT.

Assuming that the tubes are cold, and the resistors R and RN of the bridge are unheated and at the room temperature, the resistance of the resistor RN with a negative temperature coefficient is higher than the resistance of the other resistors R. Assuming that the instantaneous polarity of the upper terminal 5 of the A. C. supply is positive to apply a positive potential to the anodes of tubes T1 and T2 tending to fire these tubes, the transformer ST is so wound or connected that the instantaneous polarity of its lower terminal is likewise positive. The resistance of the resistors RN when cold being higher than the other resistors R, the voltage drop through these resistances of the current from the starting transformer ST makes the right-hand terminal 9 of the bridge negative with respect to the left-hand terminal 10, thereby providing a negative potential for the grids of the tubes T1 and T2. When the instantaneous polarity of the supply voltage reverses, the grid voltage provided by the starting transformer ST and the resistance bridge likewise reverses to give a positive potential on the grids of the tubes T1 and T2, but at this time the anodes of these tubes are negative, and they do not fire. It may also be noted that this negative voltage thus supplied to the grid circuits of the tubes T1 and T2 by the starting transformer ST during the starting periods varies with the alternating supply voltage supplied to this transformer, but is in phase with the anode voltage, so that as the voltage on the anodes of the tubes T1 and T2 increases from zero to a maximum positive value, the negative grid potential similarly increases to prevent firing of the tubes.

During the starting period under consideration while the cathodes of the tubes T1 and T2 are being heated, the resistors R and RN in the bridge are likewise being heated by current from the starting transformer ST. As these resistors RN and R become heated, the resistance of the resistors R increases in the usual way, while the resistance of the other resistors RN decreases. After some predetermined time, dependent upon the resistances and amount of heating current involved, together with other factors such as facilities for heat radiation afforded by the mounting, the resistances in the arms of the bridge become so nearly equal that the difference of potential between the terminals 9 and 10, affording a negative potential on the grids, no longer prevents firing of the tubes T1 and T2. It can be appreciated that the parts may be readily constructed and arranged so that the heating time for approximately balancing the bridge to allow the tubes to fire is comparable, with such margin as desired, with the initial heating time for the cathodes of the particular tubes T1 and T2 being used.

Thus, the starting transformer ST and associated resistance bridge provides a simple and effective means for automatically preventing firing of the tubes T1 and T2 until their cathodes are fully heated. In this connection, for the usual type of gas tube which is conductive unless some negative potential is applied to the grid, it is contemplated that the resistance bridge will be organized to assume a balanced or nearly balanced condition when fully heated; but it is evident that this bridge may be arranged to give a resultant positive varying grid voltage when fully heated, if this should be expedient or desirable for the operation of the tubes T1 and T2.

In the various applications of the invention contemplated, it may be expedient to provide a starting switch SW for enabling the operation of the devices A and B to be manually controlled by an operator from time to time if desired, such as in the case of vibratory equipment.

Assuming a starting switch SW is used, and the starting transformer ST and associated resistance bridge have acted, after the cathodes of the tubes T1 and T2 have been fully heated, to permit these tubes to be conductive, the operation of alternately energizing the devices or loads A and B may be started by closing the switch SW. When the switch SW is closed, and the supply voltage applied to the anodes of the tubes T1 and T2 becomes positive, both of these tubes are in condition to conduct current; but on account of the variations in the operating characteristics of such gas tubes and differences in the impedances in their anode circuits, which may be exaggerated, if desired, these tubes T1 and T2 will not start to conduct at exactly the same instant; and one tube will become ionized and start conduction slightly before the other. As soon as one of these tubes starts to conduct, say the tube T1, current builds up through the associated primary winding P1 of the grid transformer GT to generate an impulse voltage, which tends to hold off conduction through the other tube T2 for this half-cycle of the supply voltage, as discussed more in detail later for steady state conditions. When conduction ceases through the tube, such as tube T1, which is the first to fire, impulse voltages are generated in the secondary windings S1 and S2 of the grid transformer GT which act to render this first tube T1 non-conductive, and prepare the other tube T2 for conduction during the next positive half-cycle of the supply voltage, as more fully explained later in describing the steady state condition. Thus, each time the switch SW is closed, an operation of firing the tubes T1 and T2 alternately is initiated due to generation of impulse voltages by the grid transformer GT in the same manner that occurs under steady state conditions.

In describing the operation for steady state conditions, it is convenient to refer to the curves or graphs of current voltage shown in Figs. 3A and 3D. It should be understood that these curves are merely for explanatory purposes and relate to steady state conditions for one specific embodiment of the invention and certain assumed operating conditions, and that these curves are not applicable to all conditions, nor intended to be quantitatively accurate, in fact being somewhat idealized to simplify the illustration and explanation. In these curves, Fig. 3A represents the main alternating supply voltage, which is assumed of the usual sinusoidal wave form. The curves in Fig. 3B represent the current conducted by the respective tubes T1 and T2, and Fig. 3C shows the anode to cathode voltage across each tube, while Fig. 3D represents the grid potentials for these tubes.

Referring to the explanatory graphs of Figs. 3A to 3D, and taking as a convenient starting point for the discussion the time $t0$ when the supply voltage goes positive and conduction through the tube T1 starts, it is assumed that the device A will have a substantial inductance, in addition to the inductance of the primary P1 of the grid transformer GT, so that the tube T1 continues to conduct current for a time after the supply voltage goes negative. This, however, is merely representative of the conditions assumed; and it should be understood that this invention is not limited to the use of inductive loads. During the conduction period of the tube T1, the anode to cathode voltage across it corresponds with the relatively low arc drop voltage characteristic of gas tubes; and during this period the voltage across the tube T2 is that of the supply voltage, as indicated in the curves of Fig. 3C. Considering now the critical time indicating at $t1$, when conduction through the tube T1 ceases, because its anode to cathode voltage is no longer sufficient to sustain an arc discharge, the current in the anode circuit of this tube T1 and through the primary P1 of the grid transformer GT abruptly ceases. The resultant collapse of flux in the core of the transformer GT induces a voltage in the secondary windings S1 and S2; and the polarity of the transformer windings and connections are chosen such that this induced voltage is in a direction to make the grid of the tube T1 negative, while the grid of the other tube T2 is made positive. As a result of this impulse voltage, the potential on the grid of tube T1 is rather abruptly shifted to a negative peak value indicated at 15 in Fig. 3D, while the grid of the other tube T2 assumes some positive potential, as indicated at 16 in Fig. 3D. In this connection, the positive potential which the grid of tube T2 may assume by this impulse voltage is limited by the flow of grid current through its grid resistor 7; and for simplicity and convenience it may be assumed that this positive potential is approximately uniform as indicated, although there are usually minor variations in this potential caused by the impulse voltage. The grid of the other tube T1, however, may assume a relatively high negative peak value, as indicated at 15 in Fig. 3D, and the negative potential on the grid of the tube T1 gradually decreases from this negative peak value, as indicated in Fig. 3D, at a rate determined by the time constants of the circuit, including the reactance to resistance ratio of the grid transformer windings, and the value of the load resistor RL for this transformer. It is contemplated that these circuit elements will be chosen or adjusted to provide the desired rate of decay of the impulse voltages in the secondary windings S1, S2 of the grid transformer GT to afford the desired range of grid control.

At the time $t1$ under consideration, although the potential of the tube T2 becomes positive, the anode voltage for this tube is then negative, and this tube does not fire until the supply voltage goes positive at the time $t2$. At this time $t2$, although the anode voltage for the first tube T1 is also positive, its grid at this time is at a negative potential, due to the impulse voltage created when this tube stopped conducting, and hence this first tube T1 does not conduct, although the other tube T2 does.

The firing of the tube T2 at time t2 causes current to build up in the primary winding P2 of the grid transformer GT; and it can be seen that an increase of current at this winding P2 will have the same effect as a decrease of current in the other winding P1 with regard to the direction of voltage induced in the secondary windings S1 and S2. Consequently, another impulse is induced in the grid circuits of the tubes, which increases the negative potential on the grid of the tube T1 to another peak value indicated at 17 and tends to make the grid of another tube T2 to assume a more positive limited potential limited by a current through its grid resistor 7. The negative potential on the grid of the tube T1 gradually decays from this second peak value 17 as indicated in Fig. 3D, so that the grid of this tube is at least negative enough to prevent conduction through this tube throughout the second positive half-cycle of the supply voltage.

In other words, for the purposes of this invention, the impulse voltage for the grid circuit of the tube T1 should be sufficient to maintain the grid negative and prevent firing of the tube during the next positive half-cycle of the supply voltage; and the requirements for this result may be somewhat variable under different conditions, dependent upon the nature of the load, control characteristics of the tube and the like. However, taking the peak values and rate of decay of the negative grid potential for the tube T1 illustrated in Fig. 3D as typical, it can be seen that there are ample margins for controlling the grid of the tube for all varying conditions of the load and the like.

When conduction through the tube T1 stops at the time t1, the voltage across this tube rises to the existing value of the supply voltage, and when the other tube T2 starts to conduct, the voltage across it corresponds with its arc drop voltage, as indicated by the curves of Fig. 3C.

At the end of the conduction period of the tube T2 at the time t3, the cessation of current in the primary winding P2 induces a voltage of opposite polarity in the secondary windings S1 and S2 of the grid transformer GT, which has the effect of rather abruptly shifting the potential of the grid of tube T1 from some negative value to which it has decayed in the meantime, to some positive value as indicated at 18 to prepare this tube for conduction when the supply voltage again goes positive at the time t4. Also, at the same time the tube T1 is prepared to conduct, the potential on the grid of the tube T2 just finished conducting is abruptly shifted to a negative peak value indicated at 19, so that when its anode voltage becomes positive at the time t4, this tube T2 does not fire. In other words, the cessation of conduction through the tube T2 at the time t3 acts to shut off this tube T2 for the next positive half-cycle in the same way that the cessation of conduction through tube T1 at the time t1 acted to shut off that tube.

At the time t4, when the tube T1 again conducts for the second time, the increase in current through the primary P1 results in an impulse voltage for the grid circuits of the tubes which causes the grid of the tube T2 to assume another negative peak value indicated at 20 in Fig. 3D, without materially changing the potential of the grid of the tube T1 then conducting due to the flow of grid current in its grid resistor 6.

Thus, under the steady state conditions as just explained, each tube T1 and T2 as it stops conducting current acts through the grid transformer GT to provide impulse grid voltages, which act to prepare the other tube for conduction during the next positive half-cycle of the supply voltage, and at the same time keep the first tube shut off during this next positive half-cycle of supply voltage. Consequently, each tube is fired every alternate cycle recurrently as long as the switch SW is closed, rather than at each cycle whenever its anode voltage becomes positive, as would happen with ordinary grid control circuit arrangements. This means that devices A and B shown in Fig. 1 are alternately energized at intervals corresponding to half the frequency of the supply voltage. In other words, if these devices A and B are the operating coils of magnets of some vibratory equipment for example, then this equipment by the action of the circuit organization of this invention operates at half the speed or rate of the supply frequency in a manner which is often desirable for equipment of this character.

In addition to the use of this invention in connection with the intermittent and alternate energization of electrically operated devices A and B, it may be desirable in some situations when supplying uni-directional current to various devices or loads, to supply a total load current which exceeds the continuous current rating of the tubes to be used. The grid circuit organization of this invention enables each of the tubes T1 and T2 to be used to conduct current every alternate cycle, thereby reducing its average current, and enabling two such tubes T1 and T2 acting together to supply a total load current twice as much as either tube alone could do, and without exceeding the continuous current rating for either tube. In such a case, the current pulses will be delivered to the devices of loads A and B alternately at half frequency; and in some situations it may be desirable to supply current to a single load more frequently in accordance with the modified circuit organization shown in Fig. 2.

In the modified arrangement shown in Fig. 2, it is assumed that the two devices or loads A and B of Fig. 1 are to be combined into a single load or device C, represented schematically in block form. Under these conditions this load C is included in the circuit connection between the terminal 5 of the alternating supply voltage and the center tapped primary of the grid transformer GT, as will be apparent from the drawings without discussing the circuit connections in detail.

In this modification of Fig. 2, the grid transformer GT operates in the same manner previously explained in describing the operation of the arrangement shown in Fig. 1 to render the tubes T1 and T2 alternately conductive for alternate half-cycles; but in this case, the current pulses are supplied to the load C through one tube or the other every positive half-cycle of the supply voltage, corresponding with half-wave rectification, rather than every other positive half-cycle as in Fig. 1. Even though the energization of the load is essentially continuous, the average current through each tube T1 and T2 is only half of the average load current, so that the total load current may exceed the continuous current rating of each tube, which is a material advantage in certain types of power circuits.

From the foregoing it can be seen that the grid control circuit organization of this invention enables a pair of gas tubes to automatically control their own firing and be rendered conductive alternately on every other positive half-cycle of the alternating supply voltage. In this connection, it will be noted that when conduction through each tube ceases, regardless of when this may occur with respect to the supply voltage on account of inductance in the anode circuit of the tube, the grid transformer GT acts to provide a negative impulse voltage in the grid circuit of this tube, which gradually decays from a peak value at a rate determined by the constants of the circuit, including the load resistor RL for the secondaries of this grid transformer. In other words, after each tube has been fired, it automatically renders itself non-conductive for a time interval, which of course may be shortened or extended as desired by the appropriate proportioning of the parts to change the peak value or rate of decay of this impulse voltage. This time interval should be at least long enough for the tube to have a sufficient negative potential on its grid to prevent its firing at the beginning of the next succeeding positive half-cycle of the supply voltage. At the time this next positive half-cycle of supply voltage occurs, the other tube fires, and a negative impulse voltage is again provided for the grid circuit of the first tube, so as to perpetuate or continue, so to speak, the automatic cut-off which it itself initiated when it ceased to conduct. In other words, the firing of each tube maintains the other tube non-conductive for the current positive half-cycle of the supply voltage. In addition to the negative impulse voltages in the grid circuit of each tube, the grid transformer also acts at the same time to provide a positive impulse voltage in the grid circuit of the other tube, so that when a tube renders itself non-conductive, it provides a positive impulse voltage for the other tube.

Thus, acting in succession, each tube cuts itself off for a time when its conduction period is over, and prepares the other tube to fire; then the firing of this other tube continues the cut-off condition of the first tube for the current positive half-cycle of supply voltage; and then when the conduction period of this other tube is over, it cuts itself off and renders the first tube conductive. This same sequence is repeated over and over in such a way that the tubes automatically control their own firing and conduct alternately every other positive half-cycle of supply voltage.

Under such conditions of operation, it can be seen that, assuming suitable margins, there is self-controlled firing of the tubes independent of variations in the load, frequency of the supply voltage, or accuracy in any time delay circuits. For example, while it has been assumed for the curves shown in Figs. 3A to 3D that the electrically operable devices A and B or other loads in the anode circuits of the tubes T1 and T2 have substantial inductance, so that each tube continues to conduct current for some time after the positive half-cycle of the supply current has ceased, the same functions and principles characteristic of the invention are applicable to situations where the anode circuits of the tubes are primarily resistive. In such cases, the grid transformer windings and associated parts are chosen or adjusted so that the peak value and rate of decay of the negative impulse voltage maintains the grid of each tube sufficiently negative to prevent firing thereof for at least a full half-cycle of the supply current. With the grid control means thus arranged for resistive loads, a change in the resistance or inductance of the load will not interfere with the operation.

In this connection, it will be noted that it is not necessary that the negative potential artificially provided for the grid should decay within any critical time to the appropriate low value for this tube to fire, because cessation of conduction through the other tube causes the grid transformer GT to provide a positive impulse voltage in this grid circuit, which wipes out, so to speak, any residual negative potential on this grid. In other words, when one tube stops conducting, it automatically prepares the other tube for conduction as soon as its anode voltage becomes positive, regardless of how much decay in the negative impulse voltage for the grid of this other tube may have occurred. For example, the magnitude of the negative potential on the grid of tube T1, for example, at the time $t3$ in Fig. 3D, and the likelihood that this potential will decay enough to permit firing of this tube at the time $t4$, is not material, since the grid transformer GT acts upon cessation of conduction through the other tube T2 at this time $t3$ to provide a strong positive impulse voltage in the grid circuit of the tube T1, as indicated at 18 in Fig. 3D, thereby putting this tube T1 in condition to conduct at the time $t4$. These impulse voltages may have values appropriate for the conditions, since there is no particular limitation upon the negative potential that may be applied to the grid of the tubes, and the grid resistors 6, 7 and the flow of grid current provides the desired limit upon the positive potential the grids may assume, when the impulse voltages from the grid transformer GT are positive.

On account of these and other operating characteristics of the invention, the grid control circuit organization of this invention is adapted for various applications and uses of grid control gas tubes. The particular circuit organization illustrated in Fig. 1 for intermittent energization of devices or loads at half-frequency, and in Fig. 2 for continuous energization of a load at an average current level exceeding the continuous current rating of the tubes being used, are merely typical or representative of such applications and uses, it should be understood that various adaptations, modifications and additions may be made in the specific construction and arrangement of parts illustrated and described, without departing from the invention.

What I claim is:

1. An electrical control system of the character described for grid control gas tubes comprising in combination, a pair of gas tubes each having a control grid capable when at a negative potential of preventing conduction through the tube, a source of alternating supply voltage for the anode circuits of said tubes, a grid transformer having two opposing primary windings and two opposing secondary windings, the anode circuit of each tube including a corresponding one of said primary windings, a grid circuit for each tube including a corresponding one of the secondary windings of said grid transformer, and a circuit element constituting impedance connected with said grid transformer for determining the rate of decay of voltages induced therein, said grid transformer acting upon cessation of anode current for either of said tubes to establish for a time a negative potential on the grid of that tube and to remove such negative potential upon cessation of anode current for the other tube, whereby said tubes are fired alternately on alternate cycles of the supply voltage.

2. An electrical system of the character described comprising in combination, a pair of grid control gas tubes, a source of alternating supply voltage for the anode circuits of said tubes, a grid transformer having two opposing primary windings respectively included in the anode circuits of said tubes, said grid transformer having two secondary windings respectively connected to the grids of said tubes, and impedance connected with said secondary windings to control the rate of flux change in the core of said transformer, said grid transformer acting upon cessation of anode current through either tube to induce impulse voltages in said secondary windings to provide a negative voltage for the grid of that tube and a positive voltage for the grid of the other tube, whereby said tubes are automatically controlled to fire periodically and alternately on alternating cycles of the supply voltage.

3. A system for periodically energizing two electrically operable devices alternately comprising in combination, a pair of grid controlled gas tubes, an electrically operable device included in the anode circuit of each of said tubes, a source of alternating supply voltage for the anode circuits of said tubes, a grid circuit for each tube including a grid resistor, and circuit means including transformer windings inductively coupling the anode circuits and grid circuits of said tubes to establish for a time a negative potential on the grid of each tube when conduction through that tube ceases and to remove such negative potential when conduction through the other tube ceases, whereby said tubes are fired alternately on alternate cycles of the supply voltage to energize said electrically operable devices periodically at half the frequency of the supply voltage.

4. An electrical control system of the character described for gas tubes comprising in combination, a pair of grid control gas tubes, a source of alternating supply voltage for the anode circuits of said tubes, a grid circuit for each tube including a grid resistor, and means including inductively associated windings respectively included in the anode and grid circuits of the respective tubes for applying impulse voltages to the grids of said tubes, said means acting as conduction through either tube ceases to apply a negative voltage to the grid of that tube and a positive voltage to the grid of the other tube, whereby said tubes are fired alternately on alternate cycles of the supply voltage.

5. A grid control circuit organization for a pair of grid control gas tubes to render them conductive for alternate cycles of an alternating supply voltage comprising in combination, a pair of grid control gas tubes, a source of alternating supply voltage for the anode circuits of said tubes, a grid circuit for each tube including a grid resistor, and circuit means including transformer windings inductively interconnecting the anode and grid circuits of said tubes and responsive to changes in anode current for providing grid control voltages for said tubes, said circuit means acting upon cessation of anode current through either tube to render that tube non-conductive for a time until conduction through the other tube has occurred and ceased, whereby conduction through either tube during a positive half-cycle of the supply voltage automatically renders that tube non-conductive for the next half-cycle so that the pair of tubes are fired alternately during alternate cycles of the supply voltage.

6. A grid control circuit organization of the character described for governing the firing of gas tubes comprising in combination, a pair of grid control gas tubes, a source of alternating supply voltage associated with the anode circuits of said tubes for applying a positive potential to said anodes at the same time, a grid circuit for each tube including a grid resistor, and circuit means including transformer windings in the respective anode and grid circuits of said tubes for providing impulse voltages in said grid circuits in response to current changes in said anode circuits, said circuit means acting to apply to the grid of each tube in turn when conduction through that tube ceases a negative impulse voltage gradually decreasing from a peak value for a time, whereby the grid potential of each tube is automatically controlled by the firing of that tube to render it non-conductive for a time long enough to prevent firing of the tube at the next succeeding positive half-cycle of supply voltage.

7. An electrical control system of the character described comprising in combination, a pair of grid control gas tubes, a source of alternating supply voltage associated with the anode circuits of said tubes for applying a positive potential to said anodes at the same time, a grid circuit for each tube including a grid resistor, a grid transformer having two opposing primary windings and two opposing secondary windings included in the respective anode and grid circuits of said tubes, said grid transformer acting upon cessation of anode current for each tube in turn to provide a negative impulse voltage in the grid circuit of that tube decaying gradually from a peak value and rendering that tube non-conductive for a time, said grid transformer also acting when conduction ceases through each tube in turn to provide a positive impulse voltage in the grid circuit of the other tube to render it conductive when its anode becomes positive, whereby said tubes are automatically controlled to fire one at a time on every other half-cycle of the supply voltage.

8. An electrical system of the character described for rendering a pair of grid control gas tubes conductive in turn for alternate cycles of an alternating supply voltage comprising in combination, a pair of gas tubes each having a control grid acting when at a negative potential to prevent conduction through the tube, a grid transformer having center-tapped primary and secondary windings, a source of alternating current supply voltage, the primary windings of said transformer being included in the respective anode circuits of said tubes with said supply voltage connected between the primary center tap and the cathodes of the tubes, the secondary windings of said transformer being included in the respective grid circuits of said tubes with the secondary center tap connected to the cathodes of the tubes, an impedance connected with said transformer to control the rate of flux change in its core, said transformer acting when conduction ceases through each tube in turn at the end of a corresponding positive half cycle of the supply voltage to apply a negative impulse voltage to the grid of that tube and a positive impulse voltage to the grid of the other tube, said transformer also acting when each tube becomes conductive in turn to apply a positive impulse voltage to its grid and a negative impulse voltage to the grid of the other tube, whereby said tubes automatically control themselves to be conductive in turn during alternate cycles of the supply voltage.

9. An electrical system for supplying rectified current from an alternating supply voltage to a load by rendering a pair of grid control gas tubes conductive in turn at half the frequency of the supply voltage, said system comprising in combination with such tubes and a source of alternating supply voltage, a transformer having opposing primary windings included in the respective anode circuits of said tubes, said transformer having opposing secondary windings included in the respective grid circuits of said tubes for providing grid potentials in accordance with the voltage induced in said secondary windings to control conduction through the tubes, said grid circuits including a resistance limiting the grid current for positive grid potentials, an impedance connected with said transformer to control the rate of flux change in its core, said transformer windings being arranged and connected to apply to the grid of each tube in turn a negative impulse voltage decaying gradually from a peak value whenever conduction through that tube ceases and also whenever conduction through the other tube starts, whereby said tubes automatically control themselves to render each tube conductive periodically at half the frequency of the supply voltage.

10. Automatic grid control means for preventing conduction through a hot cathode gas tube during the initial heating of its cathode comprising in combination, a grid control hot cathode gas tube, a source of alternating supply voltage for the anode circuit of said tube, a heating transformer for supplying heating current to the cathode of said tube, a grid transformer having a secondary winding included in the grid circuit of the tube to provide a grid voltage for governing its firing, and means for providing in the grid circuit of said tube a negative voltage for a time upon energization of the heating transformer to prevent firing of the tube until after its cathode has been heated, said means including a starting transformer energized at the same time as the heating transformer, and a resistance bridge connected across the secondary of said heating transformer and also connected in the grid circuit of the tube between the grid and cathode, said resistance bridge having resistors of different temperature coefficients in its arms and being unbalanced when cool to provide a negative voltage in the grid circuit of the tube preventing its firing, said bridge changing to a substantially balanced condition after being energized for a time from said starting transformer to discontinue such negative voltage and permit the tube to fire in response to the control voltage provided by said grid transformer.

DONALD V. EDWARDS.

REFERENCES CITED

The following references are of record in the file of this patent:

UNITED STATES PATENTS

| Number | Name | Date |
|---|---|---|
| 1,935,413 | Prince | Nov. 14, 1933 |
| 1,954,029 | Stansbury | Apr. 10, 1934 |
| 1,954,680 | Morack | Apr. 10, 1934 |
| 2,451,344 | McCreary | Oct. 12, 1948 |

FOREIGN PATENTS

| Number | Country | Date |
|---|---|---|
| 428,324 | Great Britain | May 10, 1935 |